(12) United States Patent  
Yu

(10) Patent No.: US 9,315,190 B2  
(45) Date of Patent: Apr. 19, 2016

(54) HYBRID ELECTRIC VEHICLE PREFERRED MODE

(71) Applicant: FORD GLOBAL TECHNOLOGIES, LLC, Dearborn, MI (US)

(72) Inventor: Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 14/265,455

(22) Filed: Apr. 30, 2014

(65) Prior Publication Data

US 2015/0314776 A1 Nov. 5, 2015

(51) Int. Cl.

| | |
|---|---|
| *B60L 9/00* | (2006.01) |
| *B60L 11/00* | (2006.01) |
| *B60W 20/00* | (2006.01) |
| *B60W 10/06* | (2006.01) |
| *B60W 10/08* | (2006.01) |
| *B60W 10/26* | (2006.01) |
| *B60W 30/18* | (2012.01) |

(52) U.S. Cl.
CPC ............... *B60W 20/40* (2013.01); *B60W 10/06* (2013.01); *B60W 10/08* (2013.01); *B60W 10/26* (2013.01); *B60W 20/00* (2013.01); *B60W 30/18* (2013.01); *B60W 2710/06* (2013.01); *B60W 2710/08* (2013.01); *B60W 2710/244* (2013.01); *Y10S 903/93* (2013.01)

(58) Field of Classification Search
CPC ............ B60W 20/40; B60W 2710/08; B60W 2710/244; B60W 2710/06; B60W 10/06; B60W 10/08; B60W 10/26; B60W 20/00; B60W 30/18; Y10S 903/93
See application file for complete search history.

(56) References Cited

U.S. PATENT DOCUMENTS

| | | | |
|---|---|---|---|
| 6,483,198 B2 | 11/2002 | Schmitz et al. | |
| 8,285,433 B2 | 10/2012 | Ang | |
| 2008/0005462 A1* | 1/2008 | Pyeon et al. | 711/113 |
| 2008/0091314 A1* | 4/2008 | Hayashi et al. | 701/22 |
| 2008/0275601 A1* | 11/2008 | Saito et al. | 701/22 |
| 2009/0326750 A1* | 12/2009 | Ang | 701/22 |
| 2010/0311539 A1* | 12/2010 | Eisele | 477/3 |
| 2011/0029358 A1* | 2/2011 | Hyde et al. | 705/14.1 |
| 2012/0323413 A1 | 12/2012 | Kedar-Dongarkar et al. | |
| 2013/0073131 A1 | 3/2013 | Kobayashi et al. | |
| 2014/0210608 A1* | 7/2014 | Yamada | G07C 5/00 340/459 |
| 2015/0197162 A1* | 7/2015 | Martin et al. | 701/22 |

FOREIGN PATENT DOCUMENTS

WO 2013035728 A1 3/2013

OTHER PUBLICATIONS

Guohui Ren, Switch Systems Theory Apply to the Energy Control of a Hybrid Electric Vehicle, Intelligent Human-Machine Systems and Cybernetics (IHMSC), Aug. 26-27, 2011, vol. 1, pp. 148-151.

* cited by examiner

*Primary Examiner* — Mary Cheung
(74) *Attorney, Agent, or Firm* — David B. Kelley; Brooks Kushman P.C.

(57) ABSTRACT

A vehicle may include a controller programmed to adjust operational parameters defining conditions during which the vehicle is to be operated in electric mode in response to user input selecting an electric mode intensity. A frequency and total duration with which the vehicle is operated in electric mode increases for a given drive cycle as the electric mode intensity increases.

6 Claims, 3 Drawing Sheets

HYBRID ELECTRIC VEHICLE PREFERRED MODE

TECHNICAL FIELD

The present application relates to preferred electric vehicle mode for hybrid electric vehicles.

BACKGROUND

Hybrid electric vehicles are generally equipped with an algorithm to determine when to start or stop the engine based on a sequence of factors related to powertrain states and vehicle states. The engine will be kept in an "off" state or be stopped when there is not an engine-on request or when there is an engine-off request. Otherwise, the engine will be automatically started when an engine-on request is sent based on a variety of factors including battery state of charge or vehicle speed. In general, hybrid electric vehicle strategies may implement a fixed threshold to determine when to provide an engine-on request or engine-off request. For example, an engine-on request may be provided at high positive vehicle speed, and no request will be provided at low vehicle speeds.

SUMMARY

In at least one embodiment, a vehicle may include a controller programmed to adjust operational parameters defining conditions during which the vehicle is to be operated in electric mode in response to user input selecting an electric mode intensity. A frequency and total duration with which the vehicle is operated in electric mode increases for a given drive cycle as the electric mode intensity increases.

In at least one embodiment, a vehicle controller may include at least one processor programmed to, in response to user input selecting a first operating mode intensity, calibrate operational parameters defining conditions during which the vehicle is to be operated in the first operating mode. A frequency and total duration with which the vehicle is operated in the first operating mode increases for a given drive cycle as the first operating mode intensity increases.

A method of controlling a vehicle includes adjusting operational parameters defining conditions during which the vehicle is to be operated in electric mode in response to user input selecting an electric mode intensity. A frequency with which the vehicle is operated in electric mode increases for a given drive cycle as the electric mode intensity increases.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
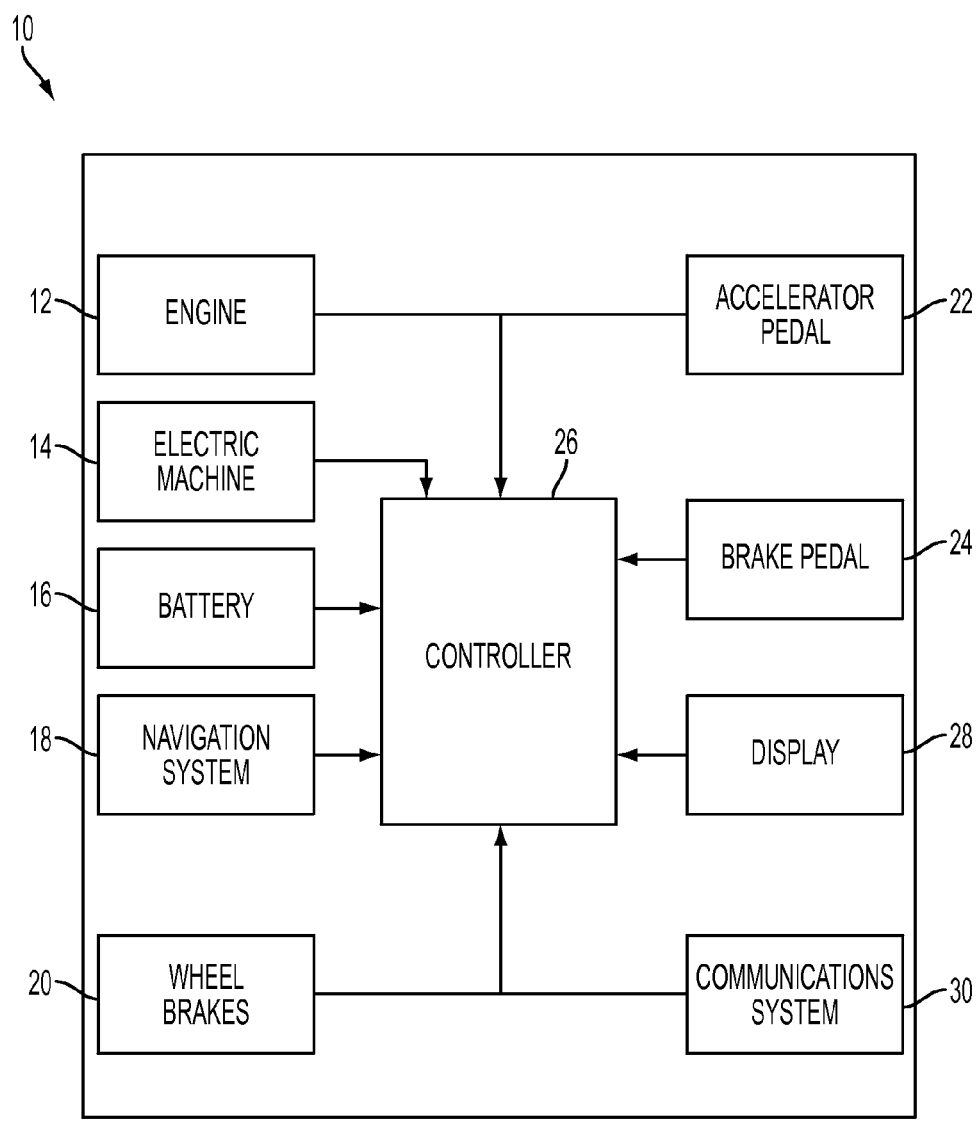
FIG. 1 is a schematic of a hybrid electric vehicle.

Referring to FIG. 1, a schematic diagram of a vehicle 10 is illustrated. The vehicle 10 includes an engine 12, an electric machine 14, a battery 16, a navigation system 18, at least one wheel brake 20, an accelerator pedal 22, and a brake pedal 24. The vehicle further includes at least one controller 26, a display 28, and a communication system 30. The engine 12, electric machine 14, battery 16, navigation system 18, wheel brake 20, accelerator pedal 22, brake pedal 24, display 28, and communications system 30 are all in communication with or under the control of the controller 26. In at least one embodiment, the navigation system 18 may be an in-vehicle GPS or aGPS system. aGPS, or Assisted GPS, modules utilize cellular communications data to improve the time to fix a location. In another embodiment, the navigation system 18 may comprise a location-enabled mobile device such as a cellular phone or standalone GPS unit. Other configurations are, of course, also possible.

The at least one controller 26 may issue stop commands and start commands to the engine 12 during vehicle operation. The controller 26 may comprise engine on/off logic that issues stop commands to shut down the engine 12 and start commands to start the engine 12.

The controller 26 may be further programmed to operate the vehicle in at least two modes. These modes may include an Electric Vehicle (EV) mode and a Hybrid Electric Vehicle (vehicle) mode. In the first mode of operation, EV mode, the engine 12 may be disabled or otherwise prevented from distributing torque to the gear box (not shown) to conserve fuel. The electric machine 14 may act as the sole or primary power source. The engine 12 may be disconnected from the remainder of the vehicle 10.

The battery 16 may transmit stored electrical energy through wiring (not shown) to be used by the electric machine 14. Upon initial vehicle start up, the controller 26 may be programmed to operate the vehicle 10 in EV mode and utilize as much pre-saved battery electric energy as possible prior to the next battery charge event.

The EV mode may have two electric energy consumption modes; a charge-sustaining (CS) mode and a charge-depleting (CD) mode. In the CS mode, the battery 16 state of charge (SOC) may be maintained around a constant SOC level. Due to the battery SOC sustenance requirement, the engine 12 may need to be started and kept on or operational to provide power for vehicle propulsion and battery 16 recharging. The controller 26 may also operate the vehicle 10 in CD mode while the battery SOC level is above a target level. In the CD mode, the battery SOC may have a net decrease during the drive cycle.

These electric energy consumption modes may assist in improving overall vehicle fuel consumption. Furthermore when operating in CD mode, the battery 16 may have sufficient electric energy conservation and its usage will not be constrained by the battery 16 SOC sustenance requirement. As a result, the controller 26 may operate the vehicle 10 in EV mode without requiring engine-on in satisfying demanded drive power in CD mode.

In the second mode of operation, the engine 12 may deliver torque through the gear box (not shown) to propel the vehicle 10. To drive the vehicle with the engine 12, at least a portion of the engine torque may transferred to the electric machine 14, and then from the electric machine 14 through the gearbox. The electric machine 14 may assist the engine 12 by providing additional power to propel the vehicle. This operation mode may be referred to as a "hybrid mode" or an "electric assist mode."

In any mode of operation, the electric machine 14 may act as a motor and provide a driving force for the vehicle 10.

Alternatively, the electric machine 14 may act as a generator and convert kinetic energy from the engine 12 into electric energy to be stored in the battery 16. The electric machine 14 may act as a generator while the engine 12 is providing propulsion power for the vehicle 10, for example. The electric machine 14 may additionally act as a generator during times of regenerative braking in which rotational energy from spinning wheels is converted into electrical energy for storage in the battery 16.

Control logic or functions performed by controller 26 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based vehicle, engine, and/or powertrain controller, such as controller 26. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 22 may be used by the driver to provide a demanded torque, power, or drive command to propel the vehicle 10. In general, depressing and releasing the accelerator pedal 22 generates an accelerator pedal position signal that may be interpreted by the controller 26 as a demand for increased power or decreased power, respectively. Based at least upon input from the accelerator pedal 22, the controller 26 may command torque from the engine 12 and/or the electric machine 14. The controller 26 may also control the timing of gear shifts within the gearbox.

A brake pedal 24 may be used by the driver to slow down or stop the vehicle 10. In response to depressing the brake pedal 24, the brake booster/master cylinder (not shown) may be activated and fluid pressure sent to the wheel brakes, such as calipers or drum brakes, which in turn apply frictional force to rotors or drums, respectively. The depressing of the brake pedal 24 may be interpreted by the controller 26 as a demand for decreased power.

It should be understood that the schematic illustrated in FIG. 1 is merely exemplary and is not intended to be limiting. Other configurations are also contemplated. Some utilize selective engagement of both an engine and a motor to transmit torque through the transmission to propel the vehicle. Others lack a motor and may rely on an engine to propel the vehicle.

The controller 26 may be provided with an engine on/off strategy that may dictate the state of engine operation depending on many factors including the vehicle state, the powertrain state and driver's control selections. The engine on/off strategy may dictate operation of the vehicle in an electric mode in which the engine is off and a hybrid electric vehicle mode in which the engine is on and operational. The engine on/off strategy may be adjusted with respect to a driver's special needs or preferences and the vehicle location. For example when driving near a home area, a customer may want to keep the vehicle engine off (EV mode) to minimize noise and emission, but may desire to resume engine on (HEV mode) performance after merging onto a public road or highway.

The operator of the vehicle 10 may desire to have flexible vehicle functionality such that either EV mode or HEV mode may be prioritized based on mode intensity or preference set by the driver or by location based control strategy. An EV-mode intensity selection methodology may enable the adjustment or calibration of operational parameters defining conditions during which the vehicle may be operated in either EV or HEV mode. Operational parameters may include but are not limited to vehicle speed, drive power, battery state of charge, battery charge/discharge limit, accelerator pedal position, power demand, air conditioning state, compression brake request, hill-hold, vehicle location, heater state, or battery temperature.

As a result of the intensity selection, the conditions to trigger either EV mode or HEV mode may be adjusted or calibrated to be more stringent or more relaxed. Consequently, the frequency with which the vehicle 10 may operate in EV mode or in HEV mode may change when operating in real world driving cycles. The likelihood of an engine startup during driving cycles is referred to as engine pull-up pull-down (EPUD) sensitivity. Sensitivity may be defined by how sensitive or easily the engine is to be pulled-up or started. Therefore, greater sensitivity may provide conditions such that it is easier to trigger engine pull-up and operate the vehicle in HEV mode during a given drive cycle. Lesser sensitivity may provide conditions such that it is more difficult to trigger engine pull-up, and the vehicle is more likely to operate in EV mode in a given drive cycle, or vice versa.

Figure 2:
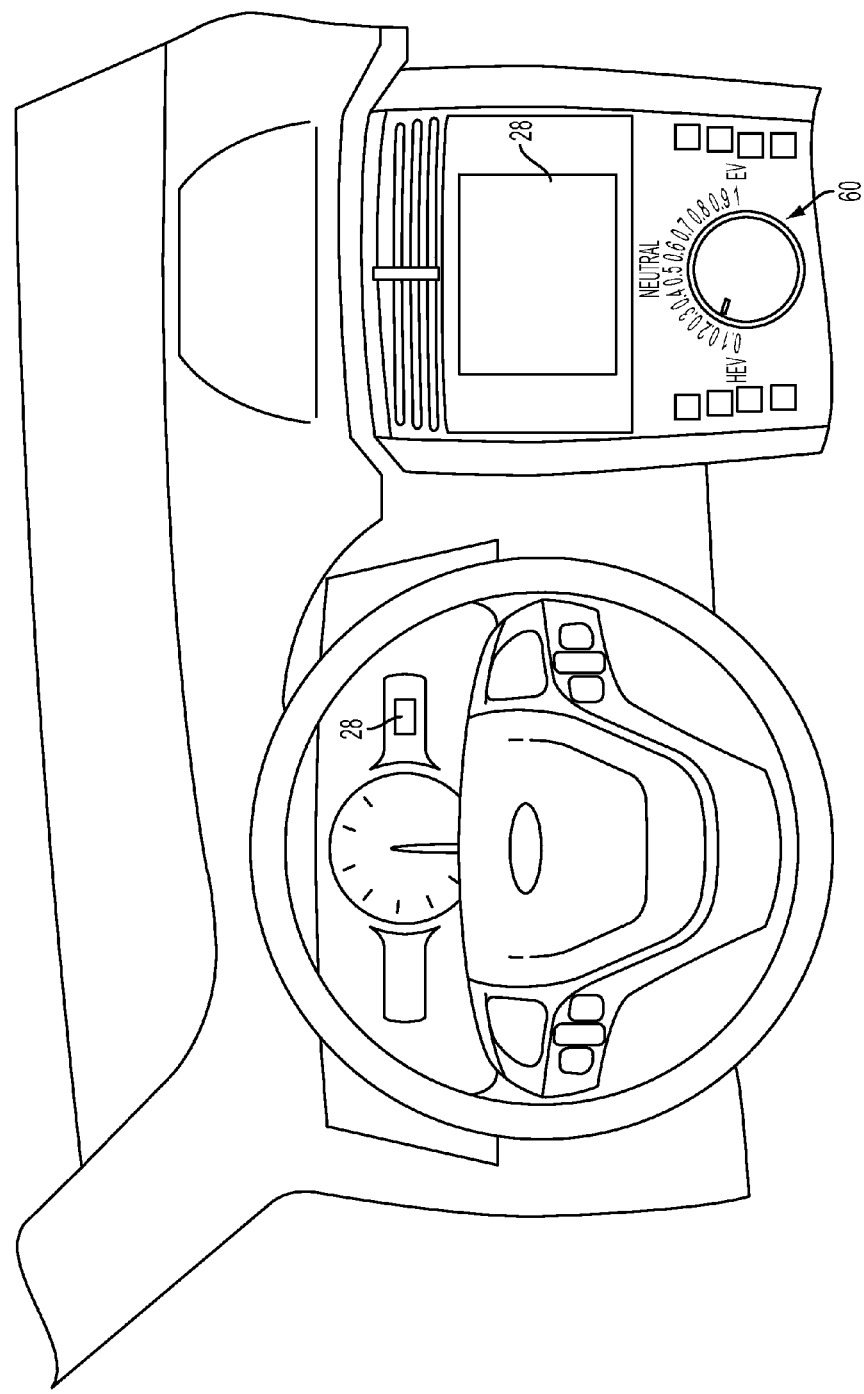
FIG. 2 is an interior view of the vehicle of FIG. 1.

The operator of the vehicle 10 may able to adjust the EPUD sensitivity state according to EV mode intensity preference settings and other control strategies. An EV mode preference intensity variable may be implemented to reflect the extent to which the operator prefers EV or HEV operation mode. Referring to FIG. 2, an operator may input an EV mode intensity or alternatively HEV mode intensity through a human machine interface. The driver may input a mode intensity preference via a display 28 disposed within a vehicle dashboard, instrument panel, or other location within the vehicle cabin accessible to the operator. The operator may input a mode intensity preference via the operator input device 60 which may be a knob, dial or other device.

If the operator increases the EV mode intensity, conditions related to triggering HEV mode may be adjusted to ensure more frequent vehicle operation in EV mode and to avoid unnecessary engine starts or transitions to HEV mode due to driver inputs or transient high drive power demands. The sensitivity of operational parameters defining conditions during which the vehicle 10 is to be operated in EV mode may be adjusted by increasing or decreasing a threshold associated with the operational parameters. Therefore, the conditions for triggering HEV mode may be more difficult to satisfy as the EV mode intensity is increased. Meaning that the sensitivity of the operational parameters may be decreased such that the frequency with which the vehicle operates in HEV mode is decreased. For example, a battery state of charge threshold may be decreased such that the HEV mode will not be triggered until a lower or decreased battery state of charge is achieved as compared to the default battery state of charge threshold.

If the operator increases the HEV mode intensity, conditions related to triggering EV mode may be adjusted to ensure more frequent vehicle operation in HEV mode such that the EPUD sensitivity may be increased to facilitate engine-on operation. The sensitivity of operational parameters defining conditions during which the vehicle 10 is to be operated in HEV mode may be adjusted by decreasing a threshold associated with the operational parameters. The conditions for triggering an engine start request will be easier to satisfy as the HEV mode intensity is increased.

A high level EV mode intensity preference variable may be defined as: $\xi \in [0, 1]$, which arbitrates the general EV mode intensity preference level. For example, $\xi=0$ may indicate that the HEV operating mode is strongly preferred by the operator. Alternatively, $\xi=1$ may indicate that the EV operating mode is strongly preferred by the operator. By default, $\xi=0.5$ may indicate the predetermined or factory setting EV mode intensity preference level.

The value of $\xi$ may generally reside between 0 and 1 and represents the extent to which an EV or HEV operating mode intensity is preferred by the operator of the vehicle 10. The larger the intensity, $\xi$, the more frequently the EV operating mode will be presented in a drive cycle, while and during the conditions during which the vehicle is to be operated in EV mode are satisfied. The smaller the intensity, $\xi$, the more frequently the HEV operating mode will be presented in a drive cycle, while and during the conditions during which the vehicle is to be operated in HEV mode are satisfied. If the battery SOC is depleted to less than the CS level, the effect of the operator EV-HEV operating mode preference may degraded and the default battery SOC sustenance requirement or other default operating indicators may influence the appropriate operating mode of the vehicle.

The intensity, $\xi$, may be set according to both an EV intensity input by the operator $\xi_{opr}$ and an index $\xi_{ctrl}$ controlled by the controller. The value of $\xi_{opr}$ may be selected by the driver through an operator input device, e.g., human machine interface, display 28, or knob 60, as shown in FIG. 2. The value of $\xi_{ctrl}$ may be determined by a feedback control loop that regulates the battery SOC with respect to a battery SOC reference profile. After $\xi_{opr}$ and $\xi_{ctrl}$ are individually determined, a final EV preference index of $\xi$ may be arbitrated among them. More preference may be given to $\xi_{opr}$ when arbitrated.

Alternatively, the controller 26 may adjust the EV mode operating intensity in response to the vehicle speed. The controller 26 may receive a signal indicative of vehicle speed from one of a plurality of sensors. For example, the operator EV mode intensity preference, $\xi_{opr}$, may be adjusted based on a vehicle speed threshold. The controller 26 may add an offset to the vehicle speed thresholds to increase or decrease the thresholds according to whether more or less EV operation is desired.

In response to an increase in EV mode intensity, the vehicle speed thresholds may be adjusted to permit additional EV mode operation. The adjusted vehicle speed thresholds may permit the transition from EV operating mode to HEV operating mode to occur at different vehicle speed levels. Above the adjusted vehicle speed threshold, the engine may be started and below the threshold the engine may be stopped. By adjusting the vehicle speed threshold, less frequent engine-on operation during a given drive cycle and an increase in the total duration of EV operating mode is expected. The vehicle speed distributions in a given drive cycle may be such that with a decreased vehicle speed threshold, the less likely the engine will be operated. Alternatively, the vehicle speed distributions in a given drive cycle may be such that an increased vehicle speed threshold may delay an engine start command/request to a higher vehicle speed level. As such, less engine-on operation may be expected in a given drive cycle. The vehicle speed distributions in a given drive cycle may be such that with a decreased vehicle speed threshold, the more likely engine-on operation may be expected in a given drive cycle.

The controller 26 may also adjust the EV mode intensity in response to the total power demand (drive power) requested by the operator in a drive cycle via the accelerator pedal 52. The total power demand (drive power), P_drv may represent the total power required at the wheels, plus an estimate of the power required to start the engine or stop the engine. The total power to start and/or stop the engine may be determined based on instantaneous vehicle speed, battery discharge limit and battery SOC level.

As the controller 26 adjusts the EV mode intensity level with respect to P_drv, the total power to start and/or stop the engine may be increased or decreased according to a drive power specified sensitivity index, which is a function of $\xi$. In general, the drive power specified sensitivity index may add offset to shift the power thresholds up or down based on the operator preference selection. The drive power specified sensitivity index may vary based on vehicle speed. At medium to high vehicle speeds, the drive power threshold may be decreased to more frequently operate the vehicle in HEV mode. At lower vehicle speeds the power threshold may be increased to less frequently operate the vehicle in HEV mode.

The controller 26 may adjust the EV mode intensity level when the $\xi_{opr}$ is set at a neutral level ~0.5. The controller may adjust EV mode intensity level freely from 0~1 according to controller function requirements. If the operator inputs an EV mode intensity level other than 0.5, the controller may be prevented from adjusting EV mode intensity.

The controller 26 may also employ a do-more strategy if the operator inputs an EV mode intensity level other than 0.5. The controller 26 may adjust the EV mode intensity level in the same direction as the operator input. For example if the operator inputs an EV mode intensity level of 0.3 (slight operator preference of HEV mode), the controller may adjust EV mode intensity level from 0.3~0. If the operator inputs an EV mode intensity level of 0.7, the controller may adjust EV mode intensity level from 0.7~1.

The controller 26 may normally transition the vehicle from EV mode to HEV mode when the accelerator pedal position or driver torque demand is greater than a threshold and vehicle speed is greater than a vehicle speed threshold. While operating the vehicle in HEV mode, the controller may also inhibit the vehicle from transitioning into EV mode when a rate of change of the accelerator pedal position is greater than a threshold.

While operating the vehicle 10 in EV mode, the controller 26 may transition to HEV mode when air conditioner (AC) operation is requested. The AC operation request may conflict with the EV mode operation preference. Therefore, the controller 26 may arbitrate between the operator EV mode preference and the controller default settings. In general, an operator's EV mode preference will win the final arbitration and a contradicting request from the driver may be displayed to the driver for final judgment. However, if the battery SOC falls below a threshold battery SOC, the controller may win the final arbitration and transition the vehicle into HEV mode to increase the battery state of charge. While the battery power desired or requested exceeds the actual battery power when operating in EV mode, the controller may transition to HEV mode.

The controller 26 may also adjust the vehicle operating mode based on the battery discharge power limit and override the operator input EV mode intensity. The controller may transition vehicle operation from EV mode to HEV mode when the battery discharge power is at or near the battery discharge power limit.

The controller may also transition from HEV mode to EV mode based on the location of the vehicle. As the vehicle approaches an operator's home or a predetermined location, the controller 26 may increase EV mode intensity such that the vehicle is operated in EV mode to minimize emission and noise proximate the operator's home or neighborhood. Alternatively, the operator or a location based control strategy may increase the EV-preference index $\xi$ to prioritize EV mode operation. The general operator specified EV-preference may be re-instated by the controller and the location based control strategy EV preference index increase may be cancelled when the vehicle leaves a home zone specified by the driver.

Prior to the vehicle 10 entering the operator's home zone or a predetermined location, the controller 26 may be programmed to increase the battery state of charge. It may be desired that a certain amount of battery electricity be conserved such that the vehicle may be maximally used as in EV mode or supply sufficient power for other usage within the home zone or predetermined location. In the case that insufficient battery SOC remains prior to arriving at the home zone or predetermined location, the battery may be actively charged by operating the vehicle in HEV mode. Furthermore, the energy drawn from the battery may also be minimized for electric energy conservation purposes.

The controller 26 may be programmed to increase EV mode intensity while the vehicle is operating within a Low Emission Zone (LEZ) or a target zone where low emission operation is desired. Fares may be charged based on the amount of particulate matter exhausted from the vehicle's emission pipe within the LEZ. Alternatively, a vehicle may be permitted to operate within the LEZ if the vehicle meets certain emission standards. While approaching or operating within the LEZ, the controller may bias operation towards EV mode as much as possible to minimize its emission related to engine-on operation. The battery electricity may be conserved prior to reaching the LEZ by the controller operating the vehicle in HEV mode. After entering the LEZ, the vehicle may operate in EV mode according to the EV preference setting from the driver or from the location based control strategy.

Additionally, as the vehicle is approaching a vehicle charging station, battery electricity usage may be maximized while fuel consumption is minimized since the battery will be replenished soon. The operator or the controller may adjust the EV mode intensity to highly prefer EV mode. This adjustment may permit relaxing the battery SOC sustenance boundary such that the EV mode may be maintained for a longer time while the battery SOC will decrease to a low SOC level.

Figure 3:
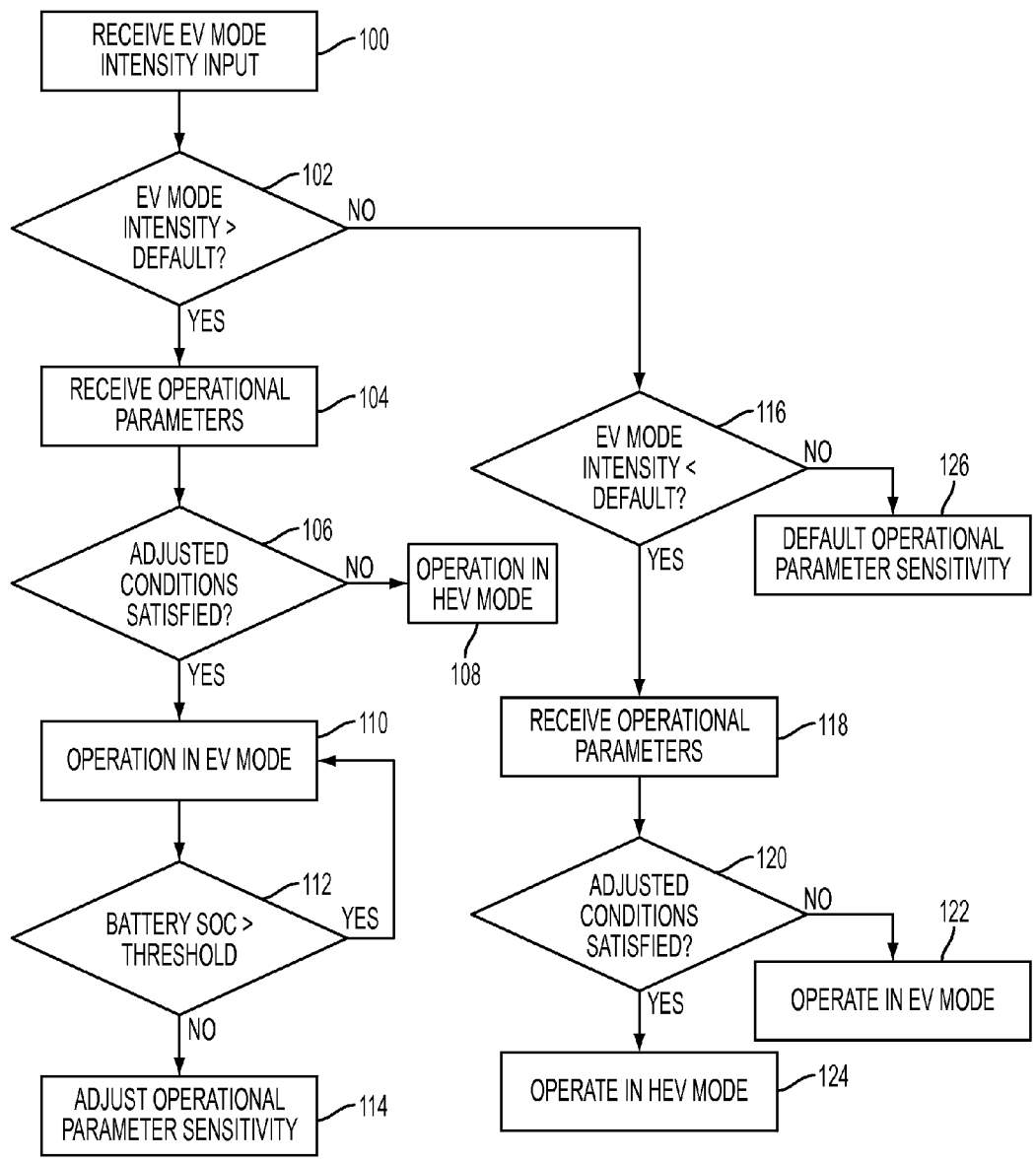
FIG. 3 is a flowchart of an exemplary method of controlling a vehicle.

Referring to FIG. 3, a flowchart of an exemplary method of controlling the vehicle 10 is shown. The method may be executed by the controller 26 and may be implemented as a closed loop control system. For brevity, the method will be described in the context of a single method iteration below.

At block 100, the method may receive an EV mode intensity input. The EV mode intensity input may indicate the operator's preference for operating the vehicle in EV mode or HEV mode. As stated previously, an EV mode intensity of 0 may indicate that the HEV operating mode is strongly preferred by the operator. An EV mode intensity of 1 may indicate that the EV operating mode is strongly preferred by the operator. An EV mode intensity of 0.5 may indicate that a default EV operating mode is preferred. If the operator does not input an EV mode intensity, the default EV mode intensity of 0.5 may be received. At block 102, if the EV mode intensity is greater than the default EV mode intensity, the method may continue to block 104.

At block 104, the method may receive operational parameters defining conditions during which the vehicle is to be operated in electric mode, with adjusted sensitivity. If the EV mode intensity is increased, the method may adjust the threshold of operational parameters towards less sensitive engine pull up response conditions such that the vehicle will less likely operate in HEV mode. Therefore the total duration and frequency of EV mode operation may be increased during a given drive cycle. At block 106, if the adjusted threshold of operational parameters defining conditions during which the vehicle is to be operated in electric mode are satisfied, the method may operate the vehicle in EV mode at block 110. If the conditions are not satisfied, the method may continue to operate the vehicle in HEV mode at block 108.

As the vehicle is operated in EV mode, at block 110, the method may continue to monitor the battery state of charge. Battery state of charge may be compared to a battery state of charge critical threshold at block 112. The battery state of charge critical threshold may be a system set threshold that the battery state of charge may not fall below even if the battery state of charge threshold is decreased in response to an increase in EV mode intensity. The battery state of charge critical threshold may be a controller set threshold that the battery state of charge is not expected to fall below in order to ensure sufficient battery electricity conservation. If the battery state of charge is greater than the battery state of charge critical threshold, the method may continue to operate the vehicle in EV mode. If the battery state of charge is approaching or less than the battery state of charge critical threshold, the method may adjust the operational parameter sensitivity towards a more sensitive engine pull-up response such that more frequent battery charge from engine is expected at block 114. The method may increase the operational parameter sensitivity, which may result in a decrease in the EV mode intensity, to increase the frequency and total duration of operation of the vehicle in HEV mode.

Returning to block 102, if the operator did not increase EV mode intensity greater than the default EV mode intensity, the method may continue to block 116. At block 116, if the EV mode intensity is less than the default EV mode intensity, the method may continue to block 118. At block 118, the method may receive operational parameters defining conditions during which the vehicle is to be operated in electric mode with adjusted sensitivity. If the EV mode intensity is decreased, the method may increase the threshold of operational parameters such that the vehicle is less sensitive to operating the vehicle in EV mode. At block 120, if the adjusted thresholds of operational parameters defining conditions during which the vehicle is to be operated in hybrid electric mode are not satisfied, the method may continue to operate the vehicle in EV mode at block 122. If the increased thresholds are satisfied, the method may continue to operate the vehicle in HEV mode at block 124.

Returning to block 116, if the operator did not increase the EV mode intensity or decrease the EV mode intensity, the method may continue to apply the default operational parameter sensitivity at block 126. In applying the default operational parameter sensitivity, the method may not adjust the operational parameter sensitivity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a controller programmed to, in response to user input designating an electric mode intensity, adjust a state of charge threshold at which the vehicle is to transition from EV mode to HEV mode during a drive cycle such that a total duration with which the vehicle is operated in EV mode increases for the drive cycle as the electric mode intensity increases.

2. The vehicle of claim 1, wherein the controller is further programmed to increase the electric mode intensity such that the vehicle is operated in electric mode while at a predetermined location.

3. The vehicle of claim 1, wherein the controller is further programmed to operate the vehicle in HEV mode such that battery state of charge is increased while proximate a predetermined location.

4. The vehicle of claim 1, wherein the controller is further programmed to, in response to an electric mode intensity increase, decrease a vehicle speed threshold such that HEV mode operation occurs at a decreased vehicle speed.

5. A method of controlling a vehicle comprising:
    reducing, by a controller, a state of charge threshold at which the vehicle is to transition from EV mode to HEV mode during a drive cycle in response to user input designating an increase in electric mode intensity such that a duration with which the vehicle is operated in electric mode increases for the drive cycle.

6. A method of controlling a vehicle comprising:
    increasing, by a controller, a state of charge threshold at which the vehicle is to transition from EV mode to HEV mode during a drive cycle in response to user input designating a decrease in electric mode intensity such that a duration with which the vehicle is operated in electric mode decreases for the drive cycle.

* * * * *